(No Model.)
G. S. MOTT.
Duplex Telegraph.
No. 243,289. Patented June 21, 1881.
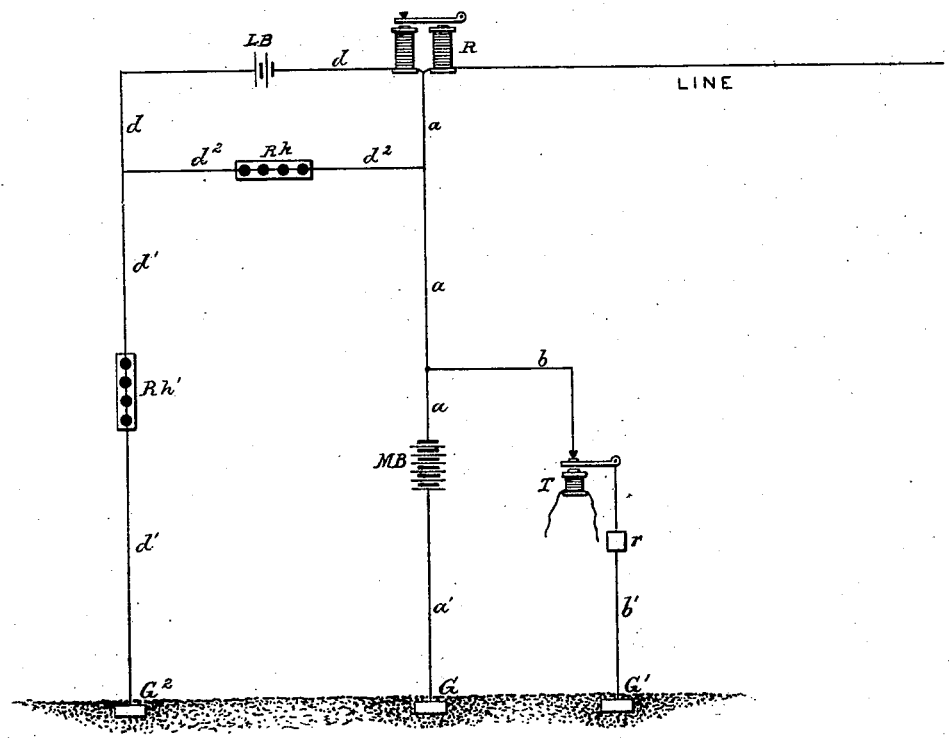
Witnesses:
Harry Smith
James F. Tobin.
Inventor:
Garret S. Mott.
by his Attorneys,
Howson and Sons

UNITED STATES PATENT OFFICE.

GARRET S. MOTT, OF PHILADELPHIA, PENNSYLVANIA.

DUPLEX TELEGRAPH.

SPECIFICATION forming part of Letters Patent No. 243,289, dated June 21, 1881.

Application filed February 14, 1881. (No model.)

*To all whom it may concern:*

Be it known that I, GARRET S. MOTT, a citizen of the United States, and a resident of Philadelphia, Pennsylvania, have invented certain Improvements in Duplex Telegraphy, of which the following is a specification.

My invention relates to certain improvements in systems of duplex telegraphy in which a local battery and circuit are combined at each station with the main battery, relay, and transmitter, as more fully described hereinafter.

The diagram in the accompanying drawing illustrates my improved duplex-telegraph system at one station, there being a similar arrangement of parts at the other station.

M B is the main battery, which is grounded through the wire $a'$, and is connected to the line through the wire $a$ and a portion of the relay, and through the wire $b$ with a back stop of the armature of the transmitter T, while this armature is grounded through the small rheostat $r$ and wire $b'$. The wire $a$ is also connected with the other portion of the relay R and local circuit $d\ d^2$, in which is the local battery L B and rheostat or resistance R $h$. The said circuit is also grounded through $d'$ and rheostat or resistance R $h'$. When the transmitter T is open the main battery is in local circuit through wires $a\ b$, transmitter-armature, wires $b'$ and $a'$, and ground, so that the battery does not affect the relay R to any appreciable extent. The current from the local battery L B in the circuit $d\ d^2$ passes through a portion of the relay R, as indicated; but the tension of the spring of the armature is so graduated as to prevent this current from causing the magnet or magnets to attract the armature. This local battery is permanently in circuit through its portion of the relay, and is adjusted by means of the resistance R $h$ to act on the relay with about the same force as the outgoing current from the main battery does on the other portion of the relay; but when the transmitter T is closed to throw the home main battery on the line through its portion of the relay, a part of the current from M B passes through the other portion of the relay and wires $d\ d'$ to the ground $G^2$, and, opposing the local battery L B, neutralizes its effect on the battery. Nor does the outgoing current cause the relay to attract its armature, since the tension of the spring of the latter is sufficient to prevent it. Hence the relay is not affected by the action of the home transmitter or main battery, but is closed only by the current from the main battery at the distant station, the main batteries at the two stations having their opposite poles to the line. The resistance R $h'$ is so adjusted as to allow only a proper proportion of the current from the home main battery to pass to the ground $G^2$ to oppose the local battery in the relay.

Instead of having a plain key or armature for the transmitter T to throw the main battery into a local circuit, the transmitter may be provided with one of the well-known circuit-preserving keys to throw the main battery into and out of circuit.

I claim as my invention—

In a station for duplex-telegraph system, the combination of a local battery permanently in circuit through a portion of the relay, with transmitter, rheostats, and circuits, substantially as described, and with a main battery which goes to line through the other portion of the relay, and has also a ground-connection through the circuit of the said local battery, opposing the latter, as set forth.

In testimony whereof I have signed my name to this specification in the presence of two subscribing witnesses.

GARRET S. MOTT.

Witnesses:
JAMES F. TOBIN,
HARRY SMITH.